United States Patent
Ogawa et al.

(10) Patent No.: US 9,814,248 B2
(45) Date of Patent: Nov. 14, 2017

(54) PHOTODEGRADATION RESISTANT BEVERAGE

(75) Inventors: Ippei Ogawa, Odawara (JP); Takeshi Imazawa, Minamiashigara (JP); Yumiko Yoshimura, Odawara (JP)

(73) Assignee: MEIJI CO., LTD., Tokyo-To (JP)

( * ) Notice: Subject to any disclaimer, the term of this patent is extended or adjusted under 35 U.S.C. 154(b) by 47 days.

(21) Appl. No.: 14/004,241

(22) PCT Filed: Mar. 9, 2012

(86) PCT No.: PCT/JP2012/056053
§ 371 (c)(1),
(2), (4) Date: Sep. 10, 2013

(87) PCT Pub. No.: WO2012/124615
PCT Pub. Date: Sep. 20, 2012

(65) Prior Publication Data
US 2013/0344218 A1 Dec. 26, 2013

(30) Foreign Application Priority Data
Mar. 11, 2011 (JP) .................................. 2011-054278

(51) Int. Cl.
| | |
|---|---|
| A23C 9/00 | (2006.01) |
| A23C 3/08 | (2006.01) |
| A23L 2/52 | (2006.01) |
| A23C 11/02 | (2006.01) |
| A23C 11/04 | (2006.01) |
| A23L 2/44 | (2006.01) |
| A23F 5/24 | (2006.01) |
| A23L 2/66 | (2006.01) |
| B65D 85/80 | (2006.01) |
| B65D 85/00 | (2006.01) |

(52) U.S. Cl.
CPC ................ *A23C 3/08* (2013.01); *A23C 11/02* (2013.01); *A23C 11/04* (2013.01); *A23F 5/243* (2013.01); *A23L 2/44* (2013.01); *A23L 2/52* (2013.01); *A23L 2/66* (2013.01); *B65D 85/70* (2013.01); *B65D 85/80* (2013.01)

(58) Field of Classification Search
CPC ........... A23C 3/08; A23C 11/02; A23C 11/04; B65D 85/80; B65D 85/70; A23L 2/52; A23L 2/44; A23L 2/66; A23F 5/243
USPC ......................... 426/580, 581, 583, 585, 130
See application file for complete search history.

(56) References Cited

U.S. PATENT DOCUMENTS

| | | | | |
|---|---|---|---|---|
| 4,446,164 A | * | 5/1984 | Brog | 426/583 |
| 4,842,884 A | * | 6/1989 | Bookwalter et al. | 426/585 |
| 5,284,674 A | * | 2/1994 | Fazio | 426/580 |
| 5,580,600 A | * | 12/1996 | Strong et al. | 426/585 |
| 6,120,814 A | | 9/2000 | Highman et al. | |
| 6,475,539 B1 | | 11/2002 | DeWille et al. | |
| 2004/0062846 A1 | | 4/2004 | Sargent et al. | |
| 2005/0287259 A1 | | 12/2005 | Inaba et al. | |
| 2006/0034999 A1 | * | 2/2006 | Hino | A23G 1/0006 426/593 |
| 2009/0238926 A1 | * | 9/2009 | Hara | A23C 3/005 426/107 |
| 2011/0033564 A1 | | 2/2011 | Tominaga et al. | |

FOREIGN PATENT DOCUMENTS

| | | |
|---|---|---|
| EP | 0 885 566 | 12/1998 |
| JP | 8-283495 | 10/1996 |
| JP | 9-37713 | 2/1997 |
| JP | 2002/262769 | 9/2002 |
| JP | 2002-262769 | 9/2002 |
| JP | 3460063 | 8/2003 |
| JP | 3683880 | 6/2005 |
| JP | 2005-178850 | 7/2005 |
| JP | 2005-523845 | 8/2005 |
| JP | 2006/20600 | 1/2006 |
| JP | 2007-166917 | 7/2007 |
| JP | 2009-284824 | 12/2009 |
| WO | 03/076277 | 9/2003 |
| WO | 2008/153158 | 12/2008 |
| WO | 2012/017984 | 2/2012 |

OTHER PUBLICATIONS

JP 9-037713 A, Feb. 1997, translation.*
Extended European Search Report dated Nov. 10, 2014 in corresponding European Application No. 12757613.0.
J.B. Webster et al., "Controlling Light Oxidation Flavor in Milk by Blocking Riboflavin Excitation Wavelengths by Interference", Journal of Food Science, vol. 74, No. 9, Nov. 1, 2009, pp. S390-S398, XP055149976.
Wendy Cladman et al., "Shelf-life of Milk Packaged in Plastic Containers With and Without Treatment to Reduce Light Transmission", International Dairy Journal, Elsevier Applied Science, Barking, GB, vol. 8, No. 7, Jul. 1, 1998, pp. 629-636, XP027368952.
English translation of International Preliminary Report on Patentability and Written Opinion dated Sep. 17, 2013.
Office Action dated Mar. 31, 2014 in Chinese Application No. 201280012928.0, with English translation.
Qing et al., "Research on flavor substances in milk and milk products", Food Science and Technology, Dec. 31, 2007, pp. 1-3, with English abstract.

(Continued)

*Primary Examiner* — Leslie Wong
(74) *Attorney, Agent, or Firm* — Wenderoth, Lind & Ponack, L.L.P.

(57) ABSTRACT

The present invention relates to a beverage having excellent photodegradation resistance. More particularly, the present invention relates to a photodegradation resistant beverage comprising a fat-free milk solid content and fat content, the fat content comprising not less than 70% by mass vegetable fat and oil, and the vegetable fat and oil is selected from the group consisting of coconut oil, sunflower oil and a mixture thereof.

11 Claims, 2 Drawing Sheets

(56) References Cited

OTHER PUBLICATIONS

Japanese Office Action of Jan. 5, 2016, in corresponding Japanese Application No. 2013-504699, with English translation.
Japanese Office Action dated Jan. 5, 2015, with English translation.
International Search Report dated Apr. 17, 2012 in International (PCT) Application No. PCT/JP2012/056053.
Office Action dated Jul. 10, 2017 in European Application No. 12757613.0.

* cited by examiner

PHOTODEGRADATION RESISTANT BEVERAGE

CROSS REFERENCE TO RELATED APPLICATION

The present application claims priority based on Japanese Patent Application 2011-054278 which is a Japanese patent application filed on Mar. 11, 2011, the entire disclosure of which is incorporated herein by reference.

TECHNICAL FIELD

The present invention relates to a beverage having excellent photodegradation resistance, a method of producing the beverage, and a method of imparting photodegradation resistance to a beverage.

BACKGROUND ART

Recently, as consumers' dietary habits become diversified, a growing variety of beverages is also demanded and a number of lines of commercial products have been developed. Among them, milk-based beverages are considered to be particularly promising as health conscious beverages in the future, from the viewpoint of various nutrients which are intrinsically contained in milk and the like.

Because milk for door-to-door delivery is, in general, not exposed to light for a long period of time in its distribution channel, it can be placed and provided in a transparent bottle. In contrast, milk for drinking or the like and dairy products, which are displayed and sold in store front, are often placed and provided in a paper container or plastic container having light blocking properties. Such milk for drinking or the like and dairy products may produce unpleasant odors that are different from original odors, which are referred to as off-flavors, as a result of milk components such as milk fat contained in those being exposed to light such as sunlight or fluorescent lamp and oxidized while displayed at the store front. To prevent this, they are, when displayed and sold, put in a container having the light blocking properties.

It is thought that the off-flavors produced in these milk for drinking or the like and dairy products is mainly caused by photooxidation of the milk component such as milk fat. Hence, the more the milk components are contained, the more the off-flavors are readily produced. A primary component of the off-flavors is a certain kind of aldehyde or the like, which is not problematic in terms of quality of the commercial product. However, flavors may become significantly different from original ones, which markedly lowers the value of product.

Meanwhile, as one of measures of improving consumption of the milk for drinking or the like and dairy products, diversification of the container is attempted these days. Of these, a container made of polyethylene terephthalate, so-called plastic bottle (or PET bottle) has been widely used in a beverage market because it has a number of benefits. The bottle can, for example, be recycled and recapped, and has high barrier properties. In addition, because transparent PET bottles allow consumers to see contents inside, the consumers can have a sense of security, which is in particular an advantageous point. Due to this, the use of these transparent PET bottles is thought to be promising for the milk for drinking or the like and dairy products. An essential object is to solve the problem of above-mentioned off-flavors.

In particular, products containing a large amount of milk components are highly demanded by the consumers from both a nutritional aspect and preferred taste aspect. Among other things, the milk fat contents impart mild flavors to beverages and are thus important components. But with a large amount of the milk components, in particular, the milk fat content, the off-flavors tend to be readily produced by light irradiation. In view of this, under current circumstance, there is no choice to stay away from distributing and selling beverages containing a large amount of the milk components, in particular, the milk fat content in the PET bottle.

For the solution, various measures have been taken. For example, a certain specific pigment composition is added or laminated in a package of a product such as milk and a container is molded; and deterioration of the quality of product is prevented by enhanced light blocking properties (See Patent Document 1, Patent Document 2, Patent Document 3 or the like).

Further, as an alternative solution, a method of solving the problem has been suggested, the method comprising adding a certain kind of additive to dairy products. What has been reported is, for example, a method comprising adding a deterioration preventive for a flavor component into a food and beverage, wherein the deterioration preventive for a flavor component is characterized by containing an oil-in-water and/or -polyhydric alcohol type emulsion, comprising an extracted tocopherol, wherein d-δ-tocopherol is contained in an amount of 45% by weight or more of a total tocopherol and ferulic acid; and a polyglycerol fatty acid ester; wherein the polyglycerol fatty acid ester comprises 35% by weight or more of one member selected from polyglyceryl fatty acid esters of which degree of glycerol condensation are tri, tetra, penta, hexa, hepta, octa, nona, and deca (Patent Document 4).

However, the conventional art using the additional additive cannot be applied to the milk for drinking in which the use of additives is prohibited. Further, when the additive is applied in the milk beverage or the like and dairy products, there is possibility that the additive destroys their flavors. Further, manufacturing processes and product costs may be affected as well.

Furthermore, as another solution, a method of solving the problem has been suggested, the method comprising adding a certain kind of treatment to dairy products. What has been reported is, for example, milk, or beverage or food product containing milk components with no off-flavors produced by photoinduction, wherein the milk, or beverage or food product containing milk components is characterized by being subjected to heat treatment at 140° C. for not less than 30 seconds and not more than 120 seconds or heat treatment conditions equivalent thereto (Patent Document 5).

In the method like the above, however, more and longer heating ends up being carried out, as compared with sterilization condition at 130° C. for about 2 seconds which is often used for chilled beverages available in the market, or sterilization condition at 140° C. for about 2 seconds which is often seen in long life beverages whose use-by date is longer than ordinal chilled beverages. Thus, the flavor may decease due to the excess heating. Further, the method like the above cannot be carried out without proper heating facilities. Product costs might be affected. Under such technical situation, it can be said that the creation of a novel milk-based beverage that is applicable to industrial production and has excellent photodegradation resistance is demanded.

PRIOR ART REFERENCES

Patent Documents

Patent Document 1: Japanese Patent Application Laid-Open Publication No. 8-283495
Patent Document 2: Japanese Translated PCT Patent Application Laid-open No. 2005-523845
Patent Document 3: Japanese Patent Application Laid-Open Publication No. 2005-178850
Patent Document 4: Japanese Patent No. 3683880
Patent Document 5: Japanese Patent No. 3460063

SUMMARY OF THE INVENTION

The present inventors has recently found that a beverage having significant photodegradation resistance can be obtained by containing specific kind of vegetable fat and oil, instead of fat contents including milk fat, at a specific ratio. The present invention is based on this finding.

Accordingly, an object of the present invention is to provide a beverage containing a specific kind of vegetable fat and oil at a specific ratio and having significant photodegradation resistance, a method of producing the beverage, and a method of imparting photoresistance to a beverage.

And, according to the present invention, provided is a photodegradation resistant beverage comprising a fat-free milk solid content and a fat content, the fat content comprising not less than 70% by mass a vegetable fat and oil, and the vegetable fat and oil is selected from the group consisting of coconut oil, sunflower oil and a mixture thereof.

Further, according to another embodiment of the present invention, provided is a method of producing a photodegradation resistant beverage comprising adding a vegetable fat and oil to said beverage comprising a fat-free milk solid content and a fat content so as to be not less than 70% by mass of the fat content of the beverage; and the vegetable fat and oil is selected from the group consisting of: coconut oil, sunflower oil and a mixture thereof.

Further, according to still another embodiment of the present invention, provided is a method of imparting photodegradation resistance to a beverage comprising adding a vegetable fat and oil to said beverage comprising a fat-free milk solid content and a fat content so as to be not less than 70% by mass of the fat content of the beverage; and the vegetable fat and oil is selected from the group consisting of: coconut oil, sunflower oil and a mixture thereof.

Further, according to still another embodiment of the present invention, provided is a use of a vegetable fat and oil selected from the group consisting of: coconut oil, sunflower oil and a mixture thereof as a photodegradation resistance imparting agent of a beverage, wherein the vegetable fat and oil is added to said beverage comprising a fat-free milk solid content and a fat content so as to be not less than 70% by mass of the fat content in the beverage.

According to the present invention, beverages having significant photodegradation resistance can be provided by allowing milk-based beverages to contain coconut oil or sunflower oil at a certain specific ratio.

Most of all, according to the present invention, even when containing milk fat which is easy to be photodegraded, off-flavors of the beverage by photodegradation can be suppressed. The present invention can be advantageously utilized in production of milk-based beverages filled in a transparent container. In addition, the coconut oil and sunflower oil are generally less expensive than the milk fat and thus the beverage of the present invention also has advantage in the light of production costs of the milk-based beverage.

DETAILED DESCRIPTION OF THE INVENTION

A photodegradation resistant beverage of the present invention is characterized by comprising a fat-free milk solid content and a fat content, the fat content comprising not less than 70% by mass coconut oil and/or sunflower oil. It is an unexpected fact that the beverage added with such specific kind of vegetable fat and oil at a specific ratio has significant photodegradation resistance.

The ratio of the vegetable fat and oil of the present invention may be required to be not less than 70% by mass of the fat content in the beverage, and is preferably not less than 80% by mass and more preferably 90% by mass.

Further, the coconut oil of the present invention preferably comprises a C8-C18 saturated or unsaturated fatty acid as a constituent fatty acid thereof. Suitable examples of such a fatty acid include caprylic acid, capric acid, lauric acid, myristic acid, palmitic acid, stearic acid, oleic acid and linoleic acid.

Further, the total amount of lauric acid and myristic acid is preferably not less than 50% by mass in the constituent fatty acid of the coconut oil.

Further, the sunflower oil of the present invention preferably comprises a C4-C22 saturated or unsaturated fatty acid as a constituent fatty acid thereof. Suitable examples of such a fatty acid include myristic acid, palmitic acid, stearic acid, oleic acid, linoleic acid, linolenic acid, arachidic acid and behenic acid.

As for the sunflower oil, a high linoleic type which is rich in linoleic acid, a high oleic type which is rich in oleic acid or the like is known. The sunflower oil of the present invention is not particularly limited to any of the types and is preferably the high oleic type. Further, the amount of oleic acid is preferably not less than 60% by mass in the constituent fatty acid of sunflower oil, and more preferably not less than 70% by mass.

As long as the coconut oil or sunflower oil of the present invention can impart photodegradation resistance, the fat and oil may be added with proteins, sugars, emulsifiers or the like, dried and powdered and then the powdered fat and oil may be used.

Further, as long as the coconut oil or sunflower oil of the present invention can impart photodegradation resistance, ones subjected to hydrogenation treatment may be used.

Further, as long as the fat content of the present invention contains the above vegetable fat and oil, it may contain other fat contents that are applicable to foods and beverages. Here, the term "fat content" is synonymous with those used with respect to nutrition labels and is a concept including not only neutral fats and fatty acids but also cholesterol contents or the like. Of these, the neutral fat mainly means glycerin fatty acid ester and the fatty acid is a concept including both of the saturated fatty acid and unsaturated fatty acid.

Then, according to a preferred embodiment of the present invention, the fat content other than the vegetable fat and oil is milk fat. In the field of food products, the milk fat and vegetable fat and oil are generally known to be food product materials having different flavor. Meanwhile, under such technical situation, according to the present invention, beverages having significant photodegradation resistance and mild flavor can be provided by adding the coconut oil or sunflower oil, as a substitute of milk fat, to the beverage.

Raw materials that providing the fat content as stated above are not particularly restricted, but are preferably, butter, raw milk, milk, special milk, component adjustment milk, low fat milk, fat-free milk, whole powdered milk, powdered fat-free milk, concentrated milk, defatted concentrated milk, condensed milk, defatted condensed milk, cream, butter oil, buttermilk or buttermilk powder.

Further, the amount of the fat content of the present invention is not particularly restricted, but is preferably not less than 1.5% by mass and not more than 5% by mass of the beverage and more preferably not less than 2% by mass and not more than 4% by mass.

Further, the "fat-free milk solid content" of the present invention refers to a milk solid content except for the milk fat. To be more specific, raw materials providing the fat-free milk solid content of the present invention are not particularly restricted as long as they are milk raw materials that are usually used in food products and examples thereof include raw milk, milk, special milk, component adjustment milk, low fat milk, fat-free milk, whole powdered milk, powdered fat-free milk, concentrated milk, defatted concentrated milk, condensed milk, defatted condensed milk, butter, cream, butter oil, buttermilk, buttermilk powder, milk whey and casein. They are preferably raw milk, milk, whole powdered milk, powdered fat-free milk, milk whey, defatted milk, defatted concentrated milk, concentrated milk, casein, butter, cream and a mixture thereof and still more preferably powdered fat-free milk, butter, and milk whey. Here, the term "milk whey" means an aqueous component which is discharged after removing curds which are produced when rennet or an acid is added to milk or defatted milk. In general, the milk whey is a water soluble component remaining after removing fats, caseins, lipid soluble vitamins or the like from milk or the like. Concrete examples thereof include cheese milk whey and rennet milk whey (or may also be referred to as "sweet milk whey") which are obtained as a by-product when natural cheese or rennet casein is produced, and casein milk whey, Quark milk whey (or may also be referred to as acid milk whey) which are obtained when acid casein or Quark is produced from defatted milk. The major components of milk whey are proteins ($\beta$-lactoglobulin, $\alpha$-lactalbumin or the like), lactose, water-soluble vitamins, salts (mineral components).

Further, the amount of the fat-free milk solid content of the present invention is not particularly restricted, but is preferably not less than 4% by mass and not more than 12% by mass of the beverage, more preferably not less than 4% by mass and not more than 10% by mass, and still more preferably not less than 5% by mass and not more than 10% by mass.

Further, in the photodegradation resistant beverage of the present invention, in addition to the above components, other food product constituents that are generally used, including, for example, aqueous medium such as water, proteins, various sugars, vitamins, minerals, organic acids, organic bases, emulsifiers, thickeners, sweeteners, acidic ingredients, fruit juice, coffee, cocoa, tea and green tea can be appropriately blended. In particular, in cases where the raw material with strong flavor such as coffee, fruit juice, cocoa, or green tea is blended in the photodegradation resistant beverage of the present invention, a beverage having the flavor that is very close to the flavor of beverages with the milk fat alone being used can be provided. That is, according to one embodiment, the beverage of the present invention further comprises coffee or fruit juice.

Further, photodegradation resistant beverage of the present invention may, even without containing an antioxidant or the like, produce the significant photodegradation resistance in its own. That is, according to a preferred embodiment of the present invention, the photodegradation resistant beverage is composed without substantially containing the antioxidant. Such a photodegradation resistant beverage has advantage in that it inhibits the deterioration of the flavor by the addition of the antioxidant and avoids increased production cost. Here, the phrase "not substantially contain" means that the beverage may contain oxidation preventive components that are different from vegetable fat and oil and are contaminants in the step of producing and using the photodegradation resistant beverage, or oxidation preventive components that are inevitably contained in the raw material other than the antioxidant. To be specific, "not substantially contain" means that the amount of the antioxidant added is preferably not more than 0.1% by mass of the whole beverage, more preferably not more than 0.01% by mass, and still more preferably 0% by mass.

Examples of the above antioxidant include L-ascorbic acid (vitamin C), catechin, rutin, tea extract, and various ($\alpha$-, $\beta$-, $\gamma$-, or $\delta$-) tocopherol (vitamin E).

Further, the pH of the photodegradation resistant beverage of the present invention is not particularly restricted, but is preferably not less than 3.0 and not more than 8.0. Adjustment of the pH can be appropriately carried out by a known technique including the adjustment of the type or added amount of each of the components or the like.

Further, according to the present invention, as described above, by adding the above vegetable fat and oil to the beverage comprising the fat-free milk solid content and fat content so as to be 70% by mass or more of the fat content in the beverage, the photodegradation resistance can be imparted to milk-based beverages or food products having such resistance can be produced.

As methods of adding the vegetable fat and oil, known techniques used in the step of producing common beverages may be used. The order of adding each of the constituents of the beverages is not particularly restricted and, for example, each of the constituents may be added simultaneously.

The temperature of the vegetable fat and oil when added is not particularly restricted, but is preferably determined as appropriate in consideration of the melting point of the vegetable fat and oil. For example, the temperature of the coconut oil when added can be set to not less than 40° C. and not more than 80° C., and the temperature of the sunflower oil when added can be set to not less than 0° C. and not more than 80° C. In addition, even in the case of the powder fat and oil, its temperature when added is not particularly restricted and determined as appropriate by those skilled in the art.

Further, after the addition of the vegetable fat and oil, the beverage may be subjected to steps used in production of the common beverage including mixing, homogenization and sterilization.

Mixing condition is not particularly restricted. Yet, the mixing can, for example, be carried out using T.K. HOMO-MIXER MARKII (manufactured by Tokushu Kika Kogyo Co., Ltd.) at not less than 4000 rpm and not more than 7000 rpm for not less than one minute and not more than 10 minutes.

Further, examples of homogenization condition include a temperature of not less than 60° C. and not more than 85° C. at not less than 5 MPa and not more than 35 MPa.

Further, examples of sterilization condition include a temperature of not less than 63° C. and not more than 150° C. for not less than one second and not more than 120 seconds.

In addition, the photodegradation resistant beverage of the present invention is in particular preferred in that it inhibits production of an odor component such as hexanal or 2-heptenal which may be an index for unpleasant flavors and/or unpleasant odors. That is, according to a preferred embodiment of the present invention, the photodegradation resistant beverage is used for inhibiting the production of hexanal or 2-heptenal by light irradiation.

Further, according to a preferred embodiment, when light irradiation is carried out at 7500 lux for 4 days, the amount of hexanal produced in the photodegradation resistant beverage is preferably not more than 4 times, more preferably not more than 3 times, and still more preferably not more than twice less than the amount when no light irradiation is carried out. Further, according to another preferred embodiment, when the light irradiation is carried out at 7500 lux for 4 days, the photodegradation resistant beverage did not produce 2-heptenal. Here, the amount of hexanal or 2-heptenal produced can be determined using the detection amount of hexanal or 2-heptenal obtained by a method described in Example 6 of the present specification as a standard.

Further, the photodegradation resistant beverage of the present invention is not particularly restricted, but is preferably a so-called beverage blended with milk (for example, milk, processed milk, milk beverage, lactobacillus beverage, or dairy blend beverage). Suitable examples of such a photodegradation resistant beverage include coffee, coffee beverage, soft drink with coffee, fruit beverage, carbonated beverage, chocolate drink, and refreshing beverage.

Further, the contents of the photodegradation resistant beverage of the present invention may contain solid in addition to fluid. With regard to the solid, both powder and solid body are included.

Evaluation of the flavor of the present invention is determined by sensory evaluation or the like. As an analysis type sensory evaluation, a discrimination test such as a paired comparison test, triangular test or ranking test can be used. In addition, a descriptive test such as a scoring method or profile method may also be used and the evaluation can be carried out by a quantitative descriptive analysis (QDA).

For example, evaluation of the degree of unpleasant flavors and/or unpleasant odors and the strength of flavor indexes can be carried out by comparing with a standard as comparative evaluation or by 5-stage evaluation, 3-stage evaluation or the like as absolute evaluation. When it comes to the panel, in cases where a panel of experts is used, the evaluation was carried out by any number of the experts and preferably by not less than 3 experts, more preferably by not less than 5 experts, and still more preferably by not less than 6 experts.

Further, the photodegradation resistant beverage of the present invention is preferably filled in a transparent container. The photodegradation resistant beverage of the present invention filled in the transparent container is preferred in that the content can be viewed and the photodegradation is suppressed, thereby offering a sense of security to consumers.

Here, the term "transparent" referred to be able to directly view the content through the container. It is preferred that light at least in a visible wavelength region of not less than 380 nm not more than 750 nm be transmitted. The light transmittance of the container in this wavelength region is not less than 50%, preferably not less than 70%, and still more preferably not less than 80%.

Further, the transparent container in the present invention does not need to be entirely transparent, and a partially transparent container is also included in the present invention. As exemplified by a container with a label and/or printed part for indicating the content being opaque or translucent and with the rest being transparent, a container having design with a transparent part and opaque part being combined so as to be distinct in plural sites, and an opaque container having only a transparent part of a size approximate to a viewing window, there are no limitations in relation to the transparent region of the transparent container.

Further, the shape of the container is not particularly restricted and examples thereof include the shape of common bottle, the shape of cup and the shape of glass. In addition, with regard to the form of packaging, forms utilizable in various distribution processes can be employed. Examples thereof include, but not limited to, forms of aseptically filled and packaged products, filled and packaged products in refrigeratable and conservable conditions, and frozen packaged products.

As materials to form the container in the present invention, materials utilized as common containers for beverages or for food products can be applied. Without limitation, glass; synthetic resin such as polyethylene, polypropylene, polyethylene terephthalate, polyethylene naphthalate, ethylene-1-alkene copolymer, nylon, polystyrene; or vinyl chloride, or the like can be used. From the viewpoint of cost, distributability, moldability, strength or the like, manufacturing using synthetic resin is in particular preferred in the present invention. Polyethylene terephthalate (PET) or polyethylene naphthalate (PEN) which is particularly excellent also in transparency is preferred.

The photodegradation resistant beverage of the present invention may be filled in the transparent container by a known technique. Further, in the light of more effective suppression of photodegradation, the photodegradation resistant beverage may further be subjected to a known treatment of lowering the concentration of dissolved oxygen or the like. The present invention includes such a embodiment.

EXAMPLES

Example 1: Examination of the Type of Vegetable Fat and Oil

Roasted coffee beans (manufactured by Doutor Coffee Co., Ltd.) 400 g were ground in a coffee mill (Nice cut mil: manufactured by Kalita Co., Ltd.) in a condition of dial 3 (fine-medium ground). The ground powders were added with 2400 g of 95° C. water, soaked at 95° C. for 15 minutes, and then filtered with a filter made of cloth (flannel), thereby obtaining coffee extraction liquid. To the obtained coffee extraction liquid 61.6 g, powdered fat-free milk 59 g, milk whey powder 5 g, sugar 40 g, instant coffee 2.3 g, HOMOGEN No. 1733 (manufactured by San-Ei Gen F.F.I., Inc.) 0.8 g as an emulsifier preparation, sodium hydrogen carbonate 1 g, unsalted butter 30 g were added and made to 1000 g with water being added. Subsequently, the obtained mixed solution was homogenized at 70° C. to obtain solution A whose total fat content was composed of milk fat alone (the total fat-free milk solid content was 6.0% by mass and the total fat content was 2.5% by mass in the solution A).

Further, solution B (98% by mass coconut oil in the total fat content) was obtained in the same manner as the solution A except that the unsalted butter 30 g was replaced with coconut oil (manufactured by Fuji Oil Co., Ltd., refined coconut oil) 24.8 g such that the amount of the total fat content is same.

Further, solution C (98% by mass palm oil in the total fat content) was obtained in the same manner as the solution A except that the unsalted butter 30 g in the solution A was replaced with palm oil (manufactured by Fuji Oil Co., Ltd., PALM ACE 10) 24.8 g such that the amount of the total fat content is same.

Further, solution D (98% by mass sunflower oil in the total fat content) was obtained in the same manner as the solution A except that the unsalted butter 30 g in the solution A was replaced with sunflower oil (manufactured by Fuji Oil Co., Ltd., HIGHALL 75B) 24.8 g such that the amount of the total fat content is same.

Constituent fatty acids of the coconut oil, palm oil and sunflower oil used in the solutions B to D were as shown in Table 1 below.

TABLE 1

Constituent fatty acid (% by mass)

| Fatty acid | Coconut oil | Palm oil | Sunflower oil |
|---|---|---|---|
| Caprylic acid (C8) | 6.5 | | |
| Capric acid (C10) | 6.2 | | |
| Lauric acid (C12) | 49.5 | 0.3 | |
| Myristic acid (C14) | 18.4 | 1.1 | 0.1 |
| Palmitic acid (C16) | 9.0 | 45.2 | 4.6 |
| Stearic acid (C18) | 2.8 | 4.0 | 3.4 |
| Oleic acid (C18:1) | 6.2 | 39.2 | 82.7 |
| Linoleic acid (C18:2) | 1.3 | 9.5 | 7.7 |
| Linolenic acid (C18:3) | 0.1 | 0.5 | 0.5 |
| Arachidic acid (C20) | | 0.2 | 0.2 |
| Behenic acid (C22) | | | 0.8 |

Note)
Of the numbers noted in parentheses, "C" represents the number of carbon atoms. In addition, the number after ":" represents the number of double bonds.

Next, the solutions A to D were heated to 100° C. for heat sterilization and, after reaching 100° C., filled in a PET bottle (transmissive for not less than 80% of light at a visible light wavelength region of not less than 350 nm and not more than 750 nm).

The pH of the solution A to D was all pH 6.93 to 6.96.
The flavor after the sterilization was as shown in Table 2.

TABLE 2

Comparison of flavors with solution A

| Solution B | Equivalent to solution A |
| Solution C | Aromatic. Different from solution A |
| Solution D | Nuts-like. Different from solution A |

The solution B with the coconut oil being used had the same flavor as the solution A with the unsalted butter being used. The solution D with the sunflower oil being used had unique flavor like nuts. Both of the solutions B and D had mild flavor. The solution C with the palm oil being used had unique aromatic flavor.

Next, the solutions A to D were stored at 5° C., under a condition of light irradiation at 2000 lux for 2 weeks. The flavor was then compared with that of fresh solution (solution immediately after production) and subjected to a sensory testing (scoring method in 3 stages) by a panel of 5 experts based on the following standard, thereby obtaining the mean of the scores.

The results are shown in FIG. 3.
1: Good without unpleasant flavors or unpleasant odors.
2: Unpleasant flavors or unpleasant odors were slightly noted.
3: Unpleasant flavors or unpleasant odors were noted.

TABLE 3

Flavors after light irradiation at 2000 lux for two weeks

| Solution A | 3 |
| Solution B | 1 |
| Solution C | 3 |
| Solution D | 1 |

After stored at 5° C. under a condition of light irradiation at 2000 lux for 2 weeks, the solution A with the unsalted butter being used and the solution C with the refined palm oil being used produced the unpleasant flavors or unpleasant odors.

On the other hand, the solution B with the refined coconut oil being blended and solution D with the refined sunflower oil being used did not produce the unpleasant flavors or unpleasant odors and had good flavors.

Example 2: Examination of Photodegradation Resistance of Milk-Based Beverage with Palm Hydrogenated Oil being Added Coffee extraction liquid was obtained by the same technique as Example 1. To the obtained coffee extraction liquid 61.6 g, powdered fat-free milk 59 g, milk whey powder 5 g, sugar 40 g, instant coffee 2.3 g, HOMOGEN No. 1733 (manufactured by San-Ei Gen F.F.I., Inc.) 0.8 g as an emulsifier preparation, sodium hydrogen carbonate 1 g, unsalted butter 30 g were added and made to 1000 g with water being added. Subsequently, the obtained mixed solution was homogenized at 70° C. to obtain solution E whose total fat content was composed of mil fat alone (the total fat-free milk solid content was 6.0% by mass and the total fat content was 2.5% by mass in the solution A).

Further, solution F (98% by mass palm hydrogenated oil in the total fat content) was obtained in the same manner as the solution E except that unsalted butter 30 g was replaced with powder fat and oil of palm hydrogenated oil (manufactured by Riken Vitamin Co., Ltd., EMAFATCO-7; iodine value=not more than 1; constituent fatty acids were as shown in Table 4 below) 31.4 g such that the amount of the total fat content is same.

TABLE 4

| Constituent fatty acid | % by mass |
|---|---|
| Caprylic acid (C8) | 6.8 |
| Capric acid (C10) | 5.7 |
| Lauric acid (C12) | 48.1 |
| Myristic acid (C14) | 18.4 |
| Palmitic acid (C16) | 9.4 |
| Stearic acid (C18) | 10.4 |
| Oleic acid (C18:1) | 0.9 |
| Linoleic acid(C18:2) | 0.2 |
| Linolenic acid(C18:3) | 0.1 |

Next, the solutions E and F were heated to 100° C. for heat sterilization and, after reaching 100° C., filled in a PET bottle (transmissive for not less than 80% of light at a visible light wavelength region of not less than 350 nm and not more than 750 nm).

There is little difference between the solution E and solution F in the flavor after the sterilization.

Next, the solutions E and F were stored at 5° C. under a condition of light irradiation at 2000 lux for 2 weeks. The flavor was then compared with that of fresh solution (solution immediately after production) and subjected to a sensory testing (scoring method in 3 stages) by a panel of 5 experts based on the following standard to obtain the mean of the scores.

The results are shown in FIG. 5.
1: Good without unpleasant flavors or unpleasant odors.
2: Unpleasant flavors or unpleasant odors were slightly noted.
3: Unpleasant flavors or unpleasant odors were noted.

TABLE 5

| Flavors after light irradiation at 2000 lux for two weeks | |
| --- | --- |
| Solution E | 3 |
| Solution F | 1 |

After stored at 5° C. under a condition of light irradiation at 2000 lux for 2 weeks, the solution E with the unsalted butter being used produced the unpleasant flavors or unpleasant odors.

On the other hand, the solution F with the palm hydrogenated oil being blended did not produce the unpleasant flavors or unpleasant odors and had good flavors.

Example 3: Examination of the Amount of Vegetable Fat and Oil Added 1

Coffee extraction liquid was obtained by the same technique as Example 1. To the obtained coffee extraction liquid 61.6 g, powdered fat-free milk 59 g, milk whey powder 5 g, sugar 40 g, instant coffee 2.3 g, HOMOGEN No. 1733 (manufactured by San-Ei Gen F.F.I., Inc.) 0.8 g as an emulsifier preparation, sodium hydrogen carbonate 1 g, unsalted butter 30 g were added and made to 1000 g with water being added.

Next, the obtained mixed solution was heated to 70° C. Preliminary emulsification (7000 rpm, 5 minutes) was carried out, followed by homogenization (20 MPa). Next, the obtained solution was again heated to 70° C. and again homogenized (20 MPa) to be mixed. The obtained solutions was heated to 100° C. for sterilization, filled in a transparent PET bottle (transmissive for not less than 80% of light at a visible light wavelength region of not less than 380 and not more than 750 nm), and capped. Further, the obtained solution was cooled to about 20° C. to obtain solution G whose total fat content was composed of mil fat alone (each of the materials was adjusted such that the total fat-free milk solid content was 6.0% by mass and the total fat content was 2.5% by mass in the solution G).

Further, solutions palm A to palm J in which the amount of refined coconut oil in the total fat content was 10 to 98% by mass were obtained by the same production method except that the unsalted butter in the solution G was replaced with coconut oil. On this occasion, the total fat-free milk solid content and total fat content in the solution G and solutions palm A to palm J was adjusted so as to be same as those in a control solution.

When summarized, the ratios of refined coconut oil and milk fat in the total fat content in the solution G and solutions palm A to palm J are as shown in Table 6 below.

TABLE 6

| | Ratio in total fats (% by mass) | |
| --- | --- | --- |
| Fatty acid | Palm oil | Milk fat |
| G | 0 | 100 |
| Palm A | 10 | 90 |
| Palm B | 20 | 80 |
| Palm C | 30 | 70 |
| Palm D | 40 | 60 |
| Palm E | 50 | 50 |
| Palm F | 60 | 40 |
| Palm G | 70 | 30 |
| Palm H | 80 | 20 |
| Palm I | 90 | 10 |
| Palm J | 98 | 2 |

Next, each of the solutions filled in the PET bottle was stored at 10° C. under a condition of light irradiation at 2000 lux for 2 weeks. Each of the solutions was thus subjected to light irradiation to yield a sample (hereinafter also referred to as sample with light irradiation).

Further, each of the solutions filled in the PET bottle was subjected to the same technique as the above except that the solution was stored in a cool and dark place (10° C.). Each of the solutions was thus not subjected to light irradiation to yield a sample (hereinafter also referred to as sample without light irradiation).

Next, for each of the solutions, the flavor of the sample with light irradiation was, as compared with that of the sample without light irradiation, subjected to a sensory testing (scoring method in 3 stages) by a panel of 6 experts based on the following standard to obtain the mean of the scores. The results are shown in FIG. 7.
5: Same as the sample without light irradiation.
4: Almost same as the sample without light irradiation.
3: Inferior to the sample without light irradiation.
2: Apparent degradation was found.
1: Significant degradation was found.

TABLE 7

| Solution | Palm oil ratio | Flavors At 2000 lux for two weeks |
| --- | --- | --- |
| G | 0 | 1 |
| Palm A | 10 | 1 |
| Palm B | 20 | 1.5 |
| Palm C | 30 | 1.5 |
| Palm D | 40 | 2.5 |
| Palm E | 50 | 2.5 |
| Palm F | 60 | 3 |
| Palm G | 70 | 4 |
| Palm H | 80 | 5 |
| Palm I | 90 | 5 |
| Palm J | 98 | 5 |

At 2000 lux for 2 weeks, with the ratio of coconut oil in the total fat content being 80% by mass, the flavor was found not to be degraded at all and the flavor was almost same with 70% by mass. On the other hand, with not more than 60%, apparent degradation of the flavor was found.

Example 4: Examination of the Additive Amount of Vegetable Fat and Oil 2

Coffee extraction liquid was obtained by the same technique as Example 1. To the obtained coffee extraction liquid 60.0 g, powdered fat-free milk 59 g, milk whey powder 5 g, sugar 40 g, instant coffee 2.3 g, HOMOGEN No. 1733 (manufactured by San-Ei Gen F.F.I., Inc.) 0.8 g as an emulsifier preparation, sodium hydrogen carbonate 1 g, unsalted butter 30 g were added and made to 1000 g with water being added.

Next, the obtained mixed solution was heated to 70° C. Preliminary emulsification (7000 rpm, 5 minutes) was carried out, followed by homogenization (20 MPa). Next, the obtained solution was again heated to 70° C. and again homogenized (20 MPa) to be mixed. The obtained solutions was heated to 100° C. for sterilization, filled in a transparent PET bottle (transmissive for not less than 80% of light at a visible light wavelength region of not less than 380 and not more than 750 nm), and capped. Further, the obtained solution was cooled to about 20° C. to obtain solution H whose total fat content was composed of mil fat alone (each of the materials was adjusted such that the total fat-free milk solid content was 6.0% by mass and the total fat content was 2.5% by mass in the solution H).

Further, solutions sunflower A to sunflower J in which the amount of sunflower oil in the total fat content was 10 to 98% by mass were obtained by the same production method except that the unsalted butter in the solution H was replaced with sunflower oil (manufactured by Fuji Oil Co., Ltd., HIGHALL 75B). On this occasion, the total fat-free milk solid content and total fat content in the solution H and solutions sunflower A to sunflower J were adjusted so as to be same as those in a control solution.

When summarized, the ratios of sunflower oil and milk fat in the total fat content in the solution H and solutions sunflower A to sunflower J are as shown in Table 8 below.

TABLE 8

| Solution | Ratio in total fats (% by mass) | |
|---|---|---|
| | Sunflower oil | Milk fat |
| H | 0 | 100 |
| Sunflower A | 10 | 90 |
| Sunflower B | 20 | 80 |
| Sunflower C | 30 | 70 |
| Sunflower D | 40 | 60 |
| Sunflower E | 50 | 50 |
| Sunflower F | 60 | 40 |
| Sunflower G | 70 | 30 |
| Sunflower H | 80 | 20 |
| Sunflower I | 90 | 10 |
| Sunflower J | 98 | 2 |

Next, each of the solutions filled in the PET bottle was stored at 10° C. under a condition of light irradiation at 2000 lux for 2 weeks, thereby obtaining each sample with light irradiation.

Further, each of the solutions filled in the PET bottle was subjected to the same technique as the above except that the solution was stored in a cool and dark place (10° C.), thereby obtaining each sample without light irradiation.

Next, for each of the solutions, the flavor of the sample with light irradiation was evaluated according to the same technique as Example 3.

The results are shown in FIG. 9.

TABLE 9

| Solution | Sunflower oil ratio | Flavors At 2000 lux for two weeks |
|---|---|---|
| H | 0% | 1 |
| Sunflower A | 10% | 1 |
| Sunflower B | 20% | 1 |
| Sunflower C | 30% | 2 |
| Sunflower D | 40% | 2.5 |
| Sunflower E | 50% | 2.5 |
| Sunflower F | 60% | 3.5 |
| Sunflower G | 70% | 4 |
| Sunflower H | 80% | 5 |
| Sunflower I | 90% | 5 |
| Sunflower J | 98% | 5 |

At 2000 lux for 2 weeks, with the ratio of sunflower oil in the total fat content being 80% by mass, the flavors were found not to be degraded at all. With the ratio being 70% by mass, the flavors were almost same. On the other hand, with the ratio being not more than 50%, apparent degradation of the flavors were found.

Example 5: Examination of Additive Amount of Vegetable Fat and Oil 3

Coffee extraction liquid was obtained by the same technique as Example 1. To the obtained coffee extraction liquid 61.6 g, powdered fat-free milk 59 g, milk whey powder 5 g, sugar 40 g, instant coffee 2.3 g, HOMOGEN No. 1733 (manufactured by San-Ei Gen F.F.I., Inc.) 0.8 g as an emulsifier preparation, sodium hydrogen carbonate 1 g, unsalted butter 30 g were added and made to 1000 g with water being added.

Next, the obtained mixed solution was heated to 70° C. Preliminary emulsification (7000 rpm, 5 minutes) was carried out, followed by homogenization (20 MPa). Next, the obtained solution was again heated to 70° C. and again homogenized (20 MPa) to be mixed. The obtained solutions was heated to 100° C. for sterilization, filled in a transparent PET bottle (transmissive for not less than 80% of light at a visible light wavelength region of not less than 380 nm and not more than 750 nm), and capped. Further, the obtained solution was cooled to about 10° C. to obtain a control solution whose total fat content was composed of mil fat alone (each of the materials was adjusted such that the total fat-free milk solid content was 6.0% by mass and the total fat content was 2.5% by mass in the control solution).

Further, the unsalted butter in the control solution was replaced with coconut oil to produce coconut oil K solution in which the amount of the coconut oil in the total fat content is 80% by mass. On this occasion, the total fat-free milk solid content and total fat content in the coconut oil K solution were adjusted so as to be same as those in a control solution.

Further, the unsalted butter in the control solution was replaced with sunflower oil to produce sunflower oil K solution in which the amount of the sunflower oil in the total fat content is 80% by mass. On this occasion, the total fat-free milk solid content and total fat content in the sunflower oil K solution were adjusted so as to be same as those in a control solution.

Next, each of the solutions filled in the PET bottle was stored at 10° C. under a condition of light irradiation at 10000 lux for 4 days to be designated as each sample with light irradiation.

Further, each of the solutions filled in the PET bottle was subjected to the same technique as the above except that the solution was stored in a cool and dark place (10° C.), thereby obtaining each sample without light irradiation.

Next, for each of the solutions, the flavors of the sample without light irradiation and sample with light irradiation were evaluated by a panel of 10 experts according to the same technique as Example 3. Then, a significant difference in scores between the samples with light irradiation was measured using Student's one tailed t test.

As a result, the scores of the coconut oil K solution and sunflower oil K solution were significantly higher, as compared with that of the control solution (coconut oil K solution: P<0.01, sunflower oil K solution: P<0.05).

Example 6: Analysis of Components as Indexes of Unpleasant Odors by Photodegradation Coffee extraction liquid was obtained by the same technique as Example 1. Next, to the obtained coffee extraction liquid 59.9 g, powdered fat-free milk 59 g, milk whey powder 5 g, sugar 40 g, instant coffee 2.3 g, HOMOGEN No. 1733 (manufactured by San-Ei Gen F.F.I., Inc.) 0.8 g as an emulsifier preparation, sodium hydrogen carbonate 1 g, unsalted butter 30 g were added and made to 1000 g with water being added.

Next, the obtained mixed solution was heated to 70° C. Preliminary emulsification (7000 rpm, 5 minutes) was carried out, followed by homogenization (20 MPa). Next, the obtained solution was again heated to 70° C. and again homogenized (20 MPa), heated to 100° C. for sterilization, filled in a transparent PET bottle (transmissive for not less than 80% of light at a visible light wavelength region of not less than 380 nm and not more than 750 nm), and capped. Further, the obtained solution was cooled to about 10° C. to obtain a sample whose total fat content was composed of milk fat alone (each of the materials was adjusted such that the total fat-free milk solid content was 6.0% by mass and the total fat content was 2.5% by mass in the sample) (hereinafter also referred to as "milk fat sample").

Further, a sample containing coconut oil was obtained in the same manner as the above milk fat sample except that the unsalted butter in the milk fat sample was replaced with coconut oil (hereinafter also referred to as "coconut oil sample").

Each of the materials was adjusted such that the total fat-free milk solid content and total fat content in the coconut oil sample was same as those in the milk fat sample.

Next, each of the milk fat sample and coconut oil samples filled in the PET bottle was stored at 10° C. under a condition of light irradiation at 7500 lux for 4 days to obtain a sample with light irradiation (hereinafter also referred to as "milk fat-light irradiation sample" and "coconut oil-light irradiation sample").

Next, each of the milk fat sample and coconut oil samples filled in the PET bottle was stored at 10° C. in a cool and dark place for 4 days to obtain a sample with no light irradiation (hereinafter also referred to as "milk fat-no light irradiation sample" and "coconut oil-no light irradiation sample").

Next, for each of the samples, the amount of odor components (hexanal and 2-heptanal) which is an index of photodegradation was measured by GC/MS (manufactured by Aglient 6890GC/5975MS).

As for a measurement method, the sample 5 g and saturated sodium chloride solution 5 g were first added in a 20 ml-vial and kept at 60° C. for 40 minutes. The odor components vaporized in a headspace during the keeping were collected by SPME fiber (manufactured by Supelco; DVB/Carboxen/PDMS, 50/30 μm; 2 cm) and introduced into GC/MS.

Equipment and condition used in the analysis of the odor components were as follows:

Equipment and Condition

GC/MS: 6890GC/5975MS (manufactured by Aglient Technologies);

Column: DB-WAX (manufactured by Aglient Technologies); 30 m×0.25 mm, 0.25 μm

Flow rate: 1 ml/min

Injection temperature: 250° C.

Temperature rising condition: 40° C. to 250° C.

(The temperature was kept at 40° C. for 5 minutes, increased at 15° C./min until reaching at 250° C. and then kept for 10 minutes.)

Ionization method: EI (electron impact ionization method), ionization voltage: 70 eV Analysis mode: Scan Hexanal and 2-heptanal were detected from the obtained total ion chromatogram, and the peak area of ions of a mass charge ratio (m/z) of 44 and 55, respectively, was considered to represent a detection amount. The detection amount for each was shown in Table 10.

TABLE 10

| Flavor component | Milk fat-no light irradiation | Milk fat-light irradiation | Palm oil-no light irradiation | Palm oil-light Irradiation |
|---|---|---|---|---|
| Hexanal | 299711 | 1097380 | 418595 | 503734 |
| 2-heptanal | 0 | 96705 | 0 | 0 |

Figure 1:
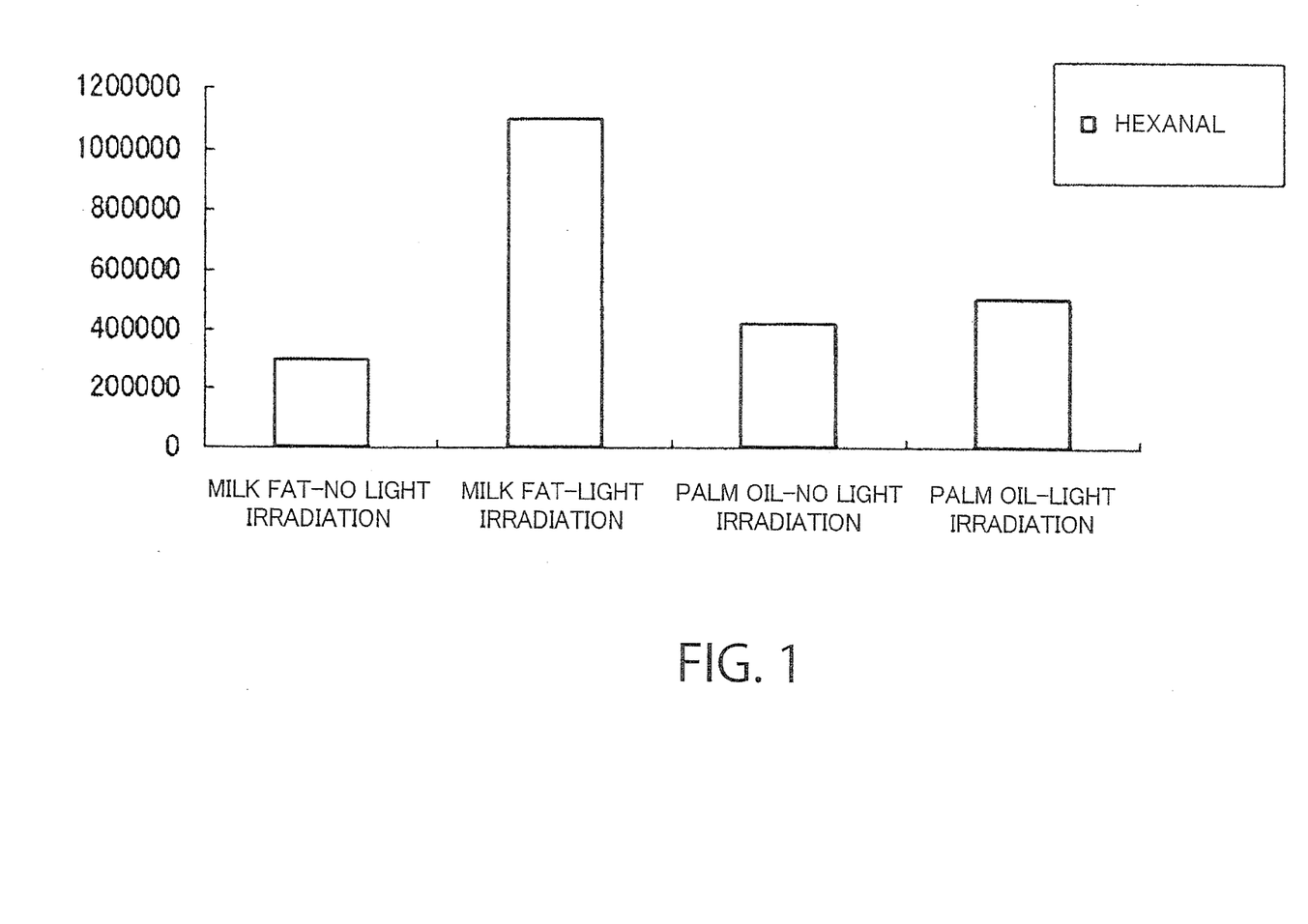
FIG. 1 is a graph showing the measurement result of the amount of hexanal in the beverage of Example 6.

Further, the result for hexanal is shown in a graph in FIG. 1.

The amount of hexanal in the milk fat-light irradiation sample was about 3.7 times as much as that in the milk fat-no light irradiation sample. In contrast, the amount of hexanal in the coconut oil-light irradiation sample was suppressed to about 1.2 times, as compared with the coconut oil-no light irradiation.

Figure 2:
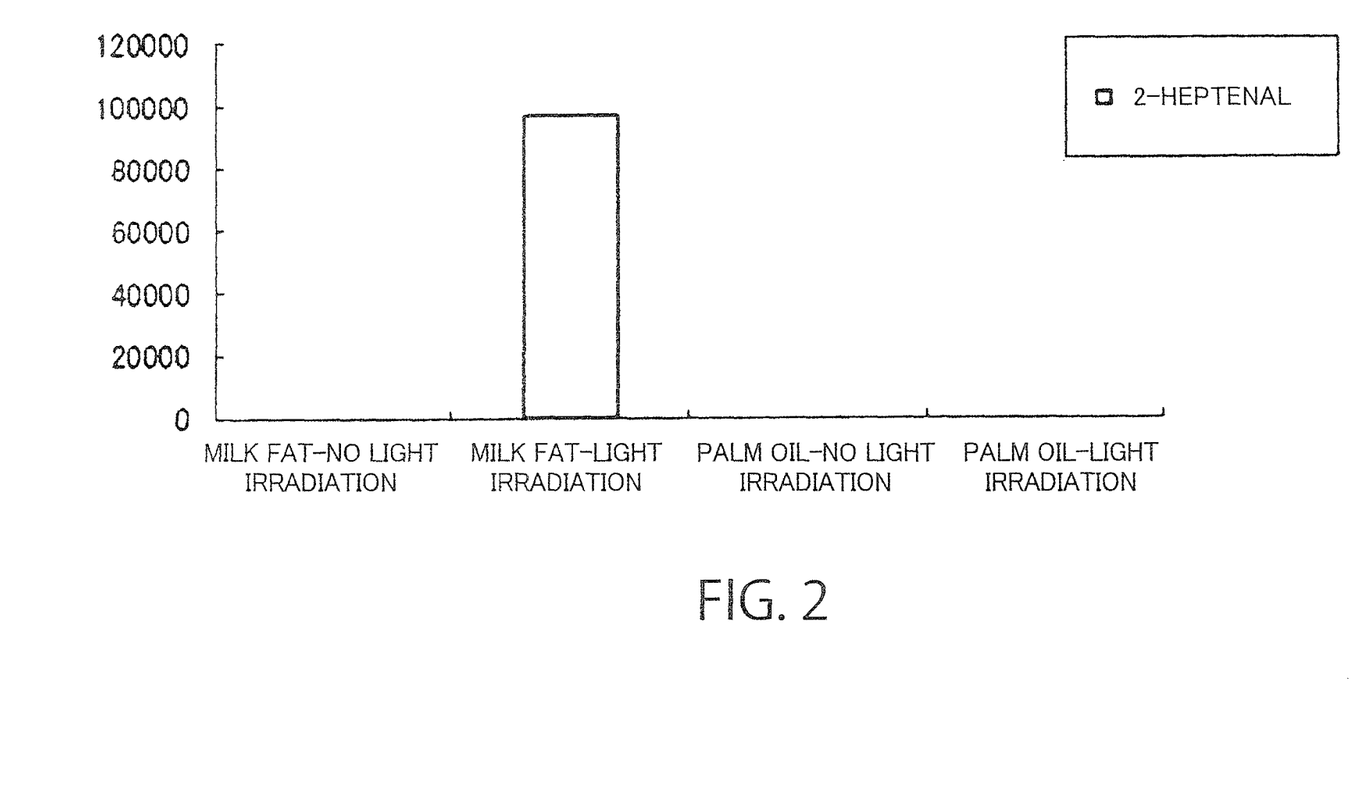
FIG. 2 is a graph showing the measurement result of the amount of 2-heptenal in the beverage of Example 6.

Further, the result for 2-heptanal is shown in a graph in FIG. 2.

In the milk fat-light irradiation sample, 2-heptanal was produced whereas 2-heptanal was not detected in the palm oil-light irradiation sample.

Further, among odor components other than hexanal and 2-heptanal, with regard to 1-octene-3-ol whose amount is represented by the peak area detected as an ion having a mass charge ratio of 57, the amount of 1-octene-3-ol in the milk fat fat-light irradiation sample (487,992) increased about 11.6 times, as compared with that in the milk fat-no light irradiation sample (42,190). In contrast, 1-octene-3-ol was not detected either the coconut oil-light irradiation sample or coconut oil-no light irradiation.

The invention claimed is:

1. A photodegradation resistant beverage comprising a fat-free milk solid content and a fat content,
    said fat content comprising not less than 70% by mass of vegetable fat and oil,
    said vegetable fat and oil being selected from coconut oil, and a mixture of coconut oil and sunflower oil,
    wherein an amount of said fat-free milk solid content is 4 to 10% by mass of said beverage,
    wherein said fat-free milk solid content is derived from at least one material selected from the group consisting of raw milk, milk, whole powdered milk, powdered fat-free milk, milk whey, defatted milk, concentrated milk, defatted concentrated milk, butter, cream, unsalted butter, and casein, wherein the photodegradation resistant beverage is in a transparent container being capable of transmitting not less than 70% of the light in a wavelength region from 380 nm to 750 nm, wherein said beverage does not substantially contain an antioxidant, and wherein said beverage resists photodegradation when stored at 10° C. under a condition of light irradiation at 2000 lux for 2 weeks or under a condition of light irradiation at 7500 lux for 4 days.

2. The beverage according to claim 1, wherein an amount of said fat content is 1.5 to 5% by mass of said beverage.

3. The beverage according to claim 1, wherein said fat content comprises milk fat.

4. The beverage according to claim 1, wherein an amount of said fat-free milk solid content is 4 to 6% by mass of said beverage.

5. The beverage according to claim 1, wherein a total amount of lauric acid and myristic acid in a constituent fatty acid of said coconut oil is not less than 50% by mass.

6. The beverage according to claim 1, wherein the amount of said oleic acid in the constituent fatty acid of said sunflower oil is not less than 80% by mass.

7. The beverage according to claim 1, further comprising coffee or fruit juice.

8. The beverage according to claim 1, wherein production of an unpleasant flavor or unpleasant odor is suppressed.

9. The beverage according to claim 1, wherein the amount of the antioxidant in said beverage is not more than 0.1% by mass of the whole beverage.

10. The beverage according to claim 9, wherein said antioxidant is selected from L-ascorbic acid, catechin, rutin, tea extract and tocopherol.

11. The beverage according to claim 1, wherein said beverage does not substantially contain 2-heptenal or 1-octene-3-ol.

* * * * *